US012629708B2

(12) United States Patent
Hang et al.

(10) Patent No.: US 12,629,708 B2
(45) Date of Patent: May 19, 2026

(54) ALL-PLASTIC PERFUME PUMP AND BOTTLE BODY USED THEREFOR

(71) Applicant: NINGBO JINYU TECHNOLOGY INDUSTRY CO., LTD, Ningbo (CN)

(72) Inventors: Cheng Hang, Ningbo (CN); Xianqiang Zhu, Ningbo (CN)

(73) Assignee: NINGBO JINYU TECHNOLOGY INDUSTRY CO., LTD., Ningbo (CN)

( * ) Notice: Subject to any disclaimer, the term of this patent is extended or adjusted under 35 U.S.C. 154(b) by 142 days.

(21) Appl. No.: 18/608,998

(22) Filed: Mar. 19, 2024

(65) Prior Publication Data

US 2025/0135479 A1 May 1, 2025

Related U.S. Application Data

(63) Continuation of application No. PCT/CN2023/128200, filed on Oct. 31, 2023.

(51) Int. Cl.

*B05B 11/00* (2023.01)
*B05B 11/10* (2023.01)
*F04B 15/00* (2006.01)
*F04B 19/04* (2006.01)

(52) U.S. Cl.

CPC ...... *B05B 11/1021* (2023.01); *B05B 11/1047* (2023.01); *F04B 15/00* (2013.01); *F04B 19/04* (2013.01)

(58) Field of Classification Search

CPC ............. B05B 11/1021; B05B 11/1047; B05B 11/1023; B05B 11/1074; B05B 11/1077; F04B 15/00; F04B 19/04; B65D 47/243; A45D 34/02

See application file for complete search history.

(56) References Cited

U.S. PATENT DOCUMENTS 7,246,723 B2 * 7/2007 Santagiuliana ..... B05B 11/1059 222/207
10,335,816 B1 * 7/2019 Arminak ............. B05B 11/1023
10,870,123 B2 * 12/2020 Deman ................... F16F 1/025
11,389,814 B1 * 7/2022 Arminak ............. B05B 11/1067
2017/0326567 A1 * 11/2017 Santagiuliana ..... B05B 11/1001
2019/0059549 A1 * 2/2019 Byun .................. B05B 11/1052
2021/0000306 A1 * 1/2021 Arminak ............. B05B 11/1077
2022/0192344 A1 * 6/2022 Lee ..................... B05B 11/0013

* cited by examiner

*Primary Examiner* — Vishal Pancholi

(74) *Attorney, Agent, or Firm* — Jose Cherson Weissbrot

(57) ABSTRACT

The present invention discloses an all-plastic perfume pump and a bottle body used therefor, where the pump includes a pump body, a plastic bead is provided in the pump body mounted in a big ring, a spacer is provided in the big ring and sleeved outside the pump body, a port on the bottom of the pump body is connected to a suction tube, a piston is provided inside the pump body and inserted with a valve needle, an upper end of the valve needle is connected to a valve stem, a top opening of the pump body is attached to a connecting lid, an upper end of the connecting lid is provided with a resilient piece sleeved on the valve stem, the valve stem is connected to a pressing cap, the resilient piece is limited by the valve stem and the valve needle.

6 Claims, 10 Drawing Sheets

ALL-PLASTIC PERFUME PUMP AND BOTTLE BODY USED THEREFOR

FIELD OF TECHNOLOGY

The present invention relates to the technical field of perfume pumps, and in particular to an all-plastic perfume pump and a bottle body used therefor.

BACKGROUND

Perfumes are prepared by dissolving spices in ethanol, sometimes minor amounts of pigments, antioxidants, bactericides, glycerin, surfactants, and the like may be added as desired. The perfume is one of the most important cosmetics that has a rich aromatic aroma, is mainly sprayed on clothes, handkerchiefs, and hairline to give off a pleasant aroma.

The perfume is generally held in a perfume bottle for use, and is sprayed out by pressing down a pressing cap of a perfume pump. At present, a spring in the perfume pump is made of metal material, when recycling, the metal spring is separated from the pump body, and then recycled separately, resulting in higher cost of recycling. Plastic springs are also used for some perfume pumps, but due to the influence of the material itself, resilience is insufficient, and liquid leakage is even caused.

SUMMARY

In order to solve the above technical problem, the present invention provides an all-plastic perfume pump including a pump body, wherein a plastic bead is provided inside the pump body, the pump body is mounted in a big ring, a piston is provided inside the pump body, a valve needle is inserted into the piston, an upper end of the valve needle is connected to a valve stem, a connecting lid is attached at a top opening of the pump body, a resilient piece is provided at an upper end of the connecting lid and sleeved on the valve stem, and the valve stem and the valve needle are used for supporting and limiting the resilient piece.

Preferably, the resilient piece and the plastic bead are both made of plastic.

Preferably, the bottom of the pump body is provided with an accommodating cavity for placing the plastic bead, and an inner wall of a pump cavity of the pump body is provided with an inner groove for clamping the connecting lid.

Preferably, the valve needle is integrally formed, the valve needle includes a needle body and a sealing ring, an upper end surface of the sealing ring is in a conical shape, the valve needle is inserted into the piston, and then the piston is mounted in the pump body, and a cavity structure is formed at the bottom of the piston and the pump body.

Preferably, an inner sleeve is provided in the middle of the connecting lid for sleeving outside the valve stem, a first outer flange is provided on an outer wall of the middle of the connecting lid for connecting the big ring, an upper support groove is provided on the upper end of the connecting lid for supporting the resilient piece, a lower support groove is provided on a lower end of the connecting lid for sleeving at an opening of the pump body.

Preferably, the valve stem includes a stem body and a boss, the diameter of the boss is greater than that of the stem body, an inner wall of the stem body is provided with an inner protruding rib, the valve needle is inserted into the stem body, the inner protruding rib is embedded in an annular groove, and the valve needle is fixed with the valve stem.

Preferably, the resilient piece is of a hollow cylindrical structure, an upper end of the resilient piece is provided with an upper support portion for being inserted into a limiting groove, and a lower end of the resilient piece is provided with a lower support portion for being inserted into the upper support groove.

Preferably, a protrusion is provided in the middle of the resilient piece, the protrusion is an arc surface, a first bevel is provided at a connection between the protrusion and the upper support portion, the first bevel is a conical surface, and the diameter of the resilient piece axially extending from the protrusion to the upper support portion gradually decreases.

Preferably, a second bevel is provided at a connection between the protrusion and the lower support portion, the second bevel is an inverted conical surface, and the diameter of the resilient piece extending axially from the protrusion to the lower support portion gradually decreases.

The present invention provides a bottle body provided with an external thread at an opening of the bottle body and connected to a big ring for storing contents.

Technical effects and advantages of the present invention are as follows:

1. In the present invention, the resilient piece and the plastic bead are made of plastic, and the resilient piece made of plastic replaces the spring made of metal so as to facilitate the overall recycling of the perfume pump, meet the environmental requirements, and reduce the recycling cost.
2. In the present invention, the perfume pump can be used for different bottle bodies, and when the contents are used up, a big ring can be unscrewed to supplement the contents and be recycled again.
3. In the present invention, the diameter of the resilient piece at the protrusion is greater than that at the first bevel and the second bevel, the flexibility at the protrusion is relatively greater, the first bevel and the second bevel are relatively greater than the hardness of the protrusion, the protrusion is provided to facilitate the resilient piece being compressed, and the first bevel and the second bevel are provided to facilitate the resilient piece being reset from a compressed state, so that the resilient piece has a greater resilient force, has better sealing performance and does not cause liquid leakage.
4. In the present invention, the plastic bead under the same volume is lighter than a glass bead, so that the plastic bead can be separated from the bottom interface of the pump body at a lower pressure of the contents to facilitate feeding.

In the figure: 1. pump body; 101. accommodating cavity; 102. inner groove; 2. plastic bead; 3. valve needle; 301. needle body; 302. liquid inlet; 303. liquid outlet; 304. annular groove; 305. sealing ring; 4. piston; 401. receptacle; 402. sealing conical surface; 5. connecting lid; 501. inner sleeve; 502. first outer flange; 503. upper support groove; 504. lower support groove; 505. second outer flange; 6. valve stem; 601. stem body; 602. boss; 603. limiting groove; 604. limiting groove; 605. inner protruding rib; 7. resilient piece; 701. protrusion; 702. upper support portion; 703. lower support portion; 704. first bevel; 705. second bevel; 8. spray sheet; 9. pressing cap; 10. big ring; 1001. sleeve; 1002. support ring; 1003. annular groove; 1004. internal thread; 1005. clamping groove; 11. spacer; 12. suction tube.

DESCRIPTION OF THE EMBODIMENTS

The present invention will now be described in further detail referring to the accompanying drawings and detailed description. The embodiments of the present invention have been presented for purposes of illustration and description, and are not intended to be exhaustive or limited to the present invention in the form disclosed. Many modifications and variations will be apparent to a person skilled in the art. The embodiments were chosen and described in order to best explain the principles of the present invention and the practical application, and to enable a person skilled in the art to understand the present invention for various embodiments with various modifications as are suited to the particular use contemplated.

Figure 1:
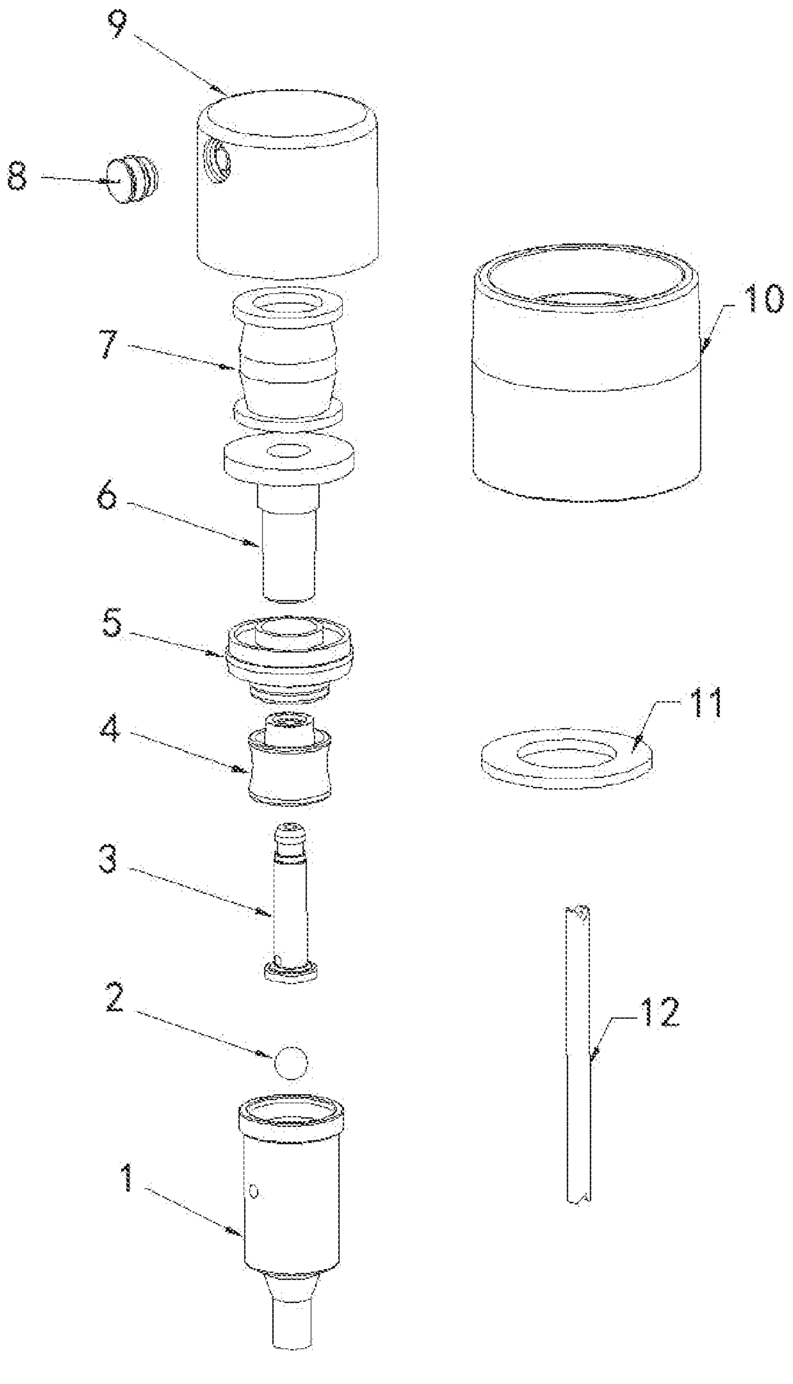
FIG. 1 is an explosion diagram of an all-plastic perfume pump according to an embodiment of the present application.
Figure 2:
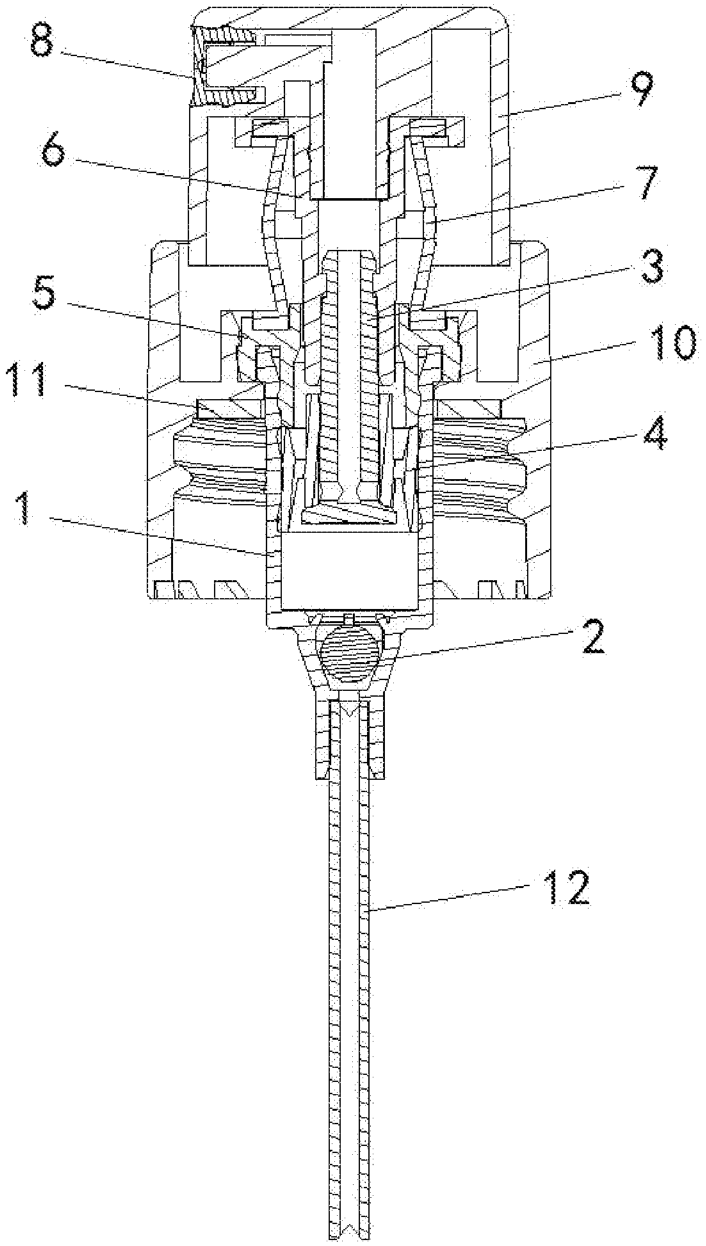
FIG. 2 is a cross-sectional view of an all-plastic perfume pump according to an embodiment of the present application.
Figure 3:
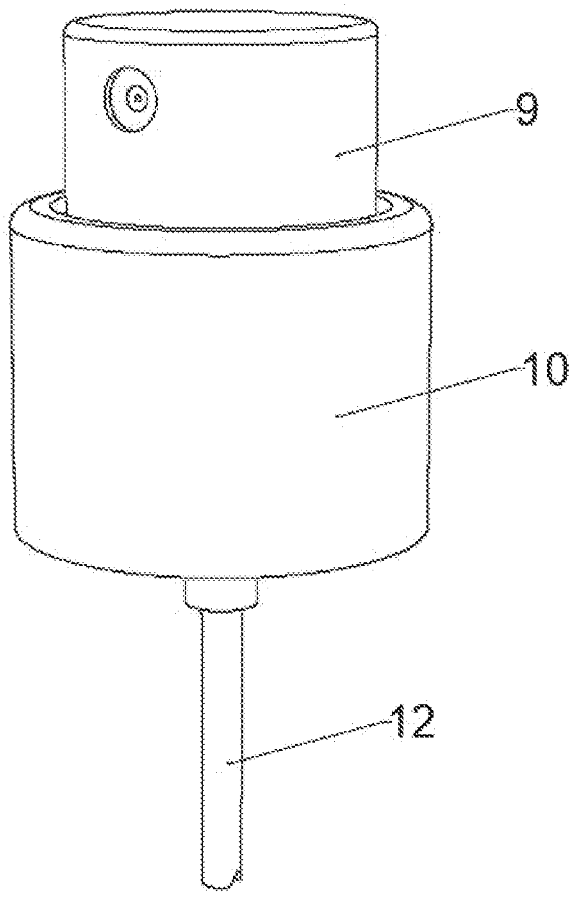
FIG. 3 is a schematic diagram showing a structure of an all-plastic perfume pump according to an embodiment of the present application.

Referring to FIGS. 1-3, the present embodiment provides an all-plastic perfume pump including a pump body 1, wherein a plastic bead 2 is provided inside the pump body 1 mounted in a big ring 10, a spacer 11 is provided inside the big ring 10 and sleeved outside the pump body 1, the bottom of the pump body 1 is connected to a suction tube 12, a piston 4 is provided inside the pump body 1 and inserted with a valve needle 3, an upper end of the valve needle 3 is connected to a valve stem 6, a top opening of the pump body 1 is attached to a connecting lid 5, an upper end of the connecting lid 5 is provided with a resilient piece 7 sleeved on the valve stem 6, the valve stem 6 is connected to a pressing cap 9, a spray sheet 8 is provided at a liquid outlet of the pressing cap 9, the resilient piece 7 is limited by the valve stem 6 and the valve needle 3, the resilient piece 7 and the plastic bead 2 are both made of plastic and can be continuously recycled, so as to be convenient for recycling and satisfy environmental requirements, the perfume pump can be used for different bottle bodies, and when the contents are used up, the big ring 10 can be unscrewed to supplement the contents and be recycled again.

Figure 4:
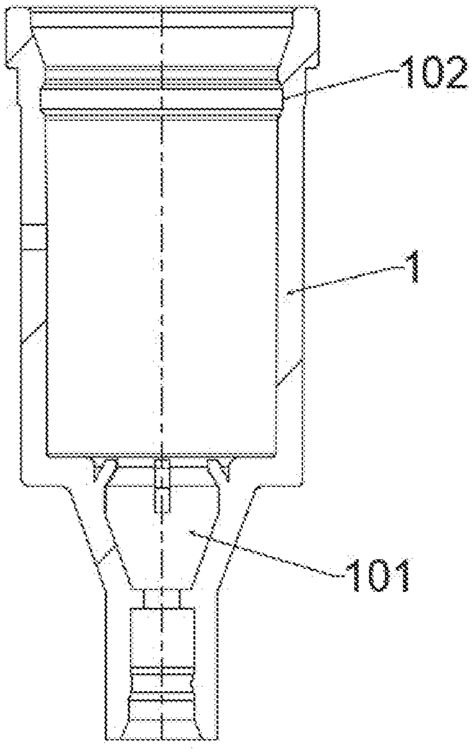
FIG. 4 is a cross-sectional view of a pump body in an all-plastic perfume pump according to an embodiment of the present application.

In the present embodiment, referring to FIG. 4, the bottom of the pump body 1 is provided with an accommodating cavity 101 for placing the plastic bead 2, an inner wall of the accommodating cavity 101 is provided with an inclined rib for limiting the plastic bead 2 and preventing the plastic bead 2 from falling out of the accommodating cavity 101, and the inner wall of the pump cavity of the pump body 1 is provided with an inner groove 102 for clamping the connecting lid 5 which serves to seal the pump body 1.

Figure 5:
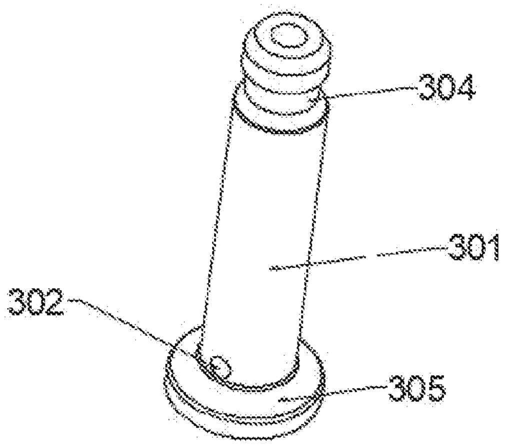
FIG. 5 is a schematic diagram showing a structure of a valve needle in an all-plastic perfume pump according to an embodiment of the present application.
Figure 6:
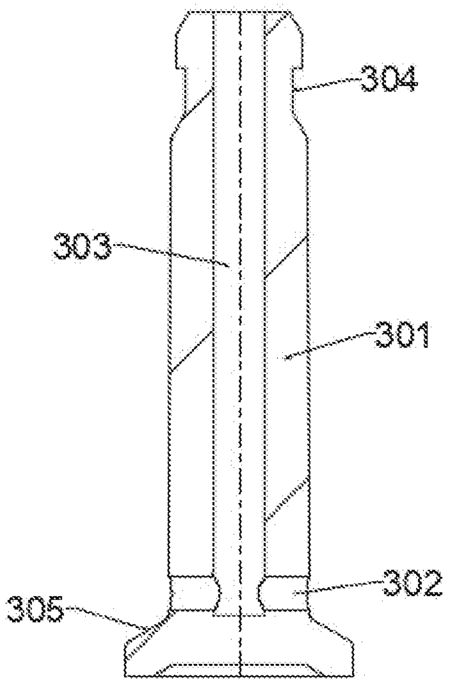
FIG. 6 is a cross-sectional view of a valve needle in an all-plastic perfume pump according to an embodiment of the present application.

In the present embodiment, referring to FIGS. 5 and 6, the valve needle 3 includes a needle body 301 and a sealing ring 305, an upper end surface of the sealing ring 305 is in a conical shape, the valve needle 3 is integrally formed, a liquid outlet 303 is provided in needle body 301, a liquid inlet 302 is provided at the bottom of the needle body 301, so that liquid can enter from the liquid inlet 302 and flow out from the liquid outlet 303, an outer wall of the upper part of the needle body 301 is provided with an annular groove 304 for fixing the needle body 301 and the valve stem 6, the valve needle 3 is inserted into the piston 4, and then the piston 4 is mounted in the pump body 1, the piston 4 and the bottom of the pump body 1 form a cavity structure used for containing contents.

Figure 7:
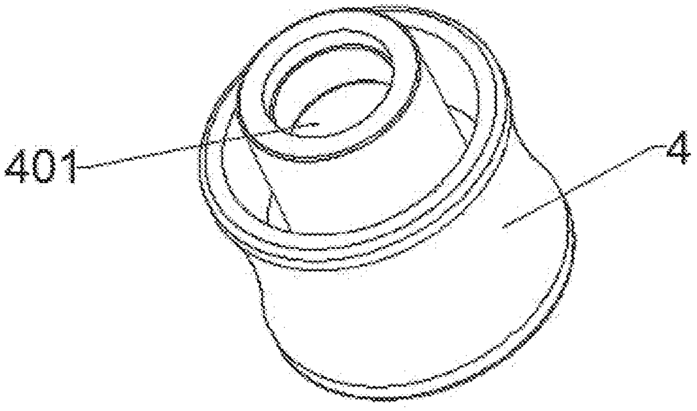
FIG. 7 is a schematic diagram showing a structure of a piston in an all-plastic perfume pump according to an embodiment of the present application.
Figure 8:
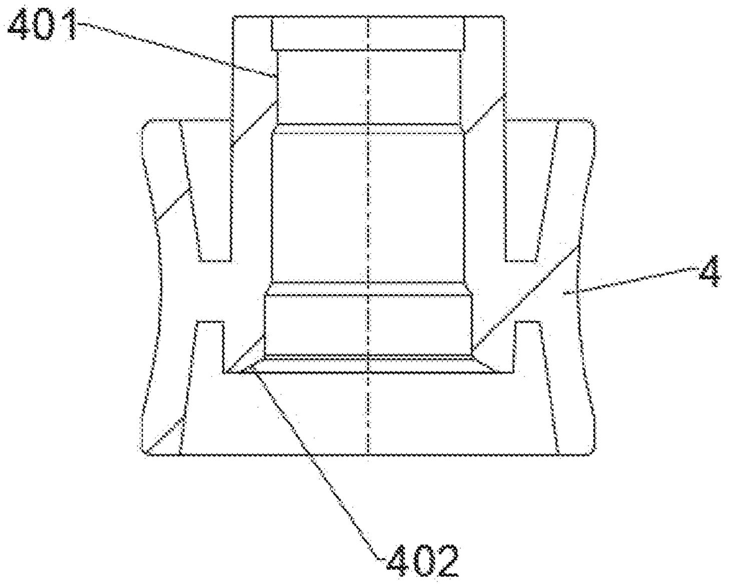
FIG. 8 is a cross-sectional view of a piston in an all-plastic perfume pump according to an embodiment of the present application.

In the present embodiment, referring to FIGS. 7 and 8, a receptacle 401 is provided in the middle of the piston 4 for inserting the valve needle 3, a sealing conical surface 402 is provided on the inner wall of the piston 4 located at the bottom of the receptacle 401, when discharging, the sealing conical surface 402 is separated from the upper end surface of the sealing ring 305, the material body enters the valve needle 3, and when not discharging, the sealing conical surface 402 abuts against the upper end surface of the sealing ring 305, and can play a sealing function.

Figure 9:
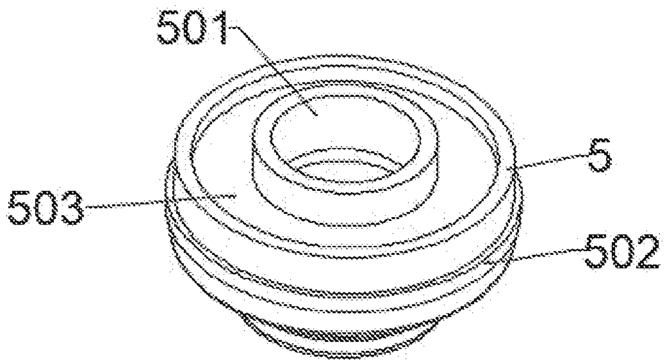
FIG. 9 is a schematic diagram showing a structure of a connecting lid in an all-plastic perfume pump according to an embodiment of the present application.
Figure 10:
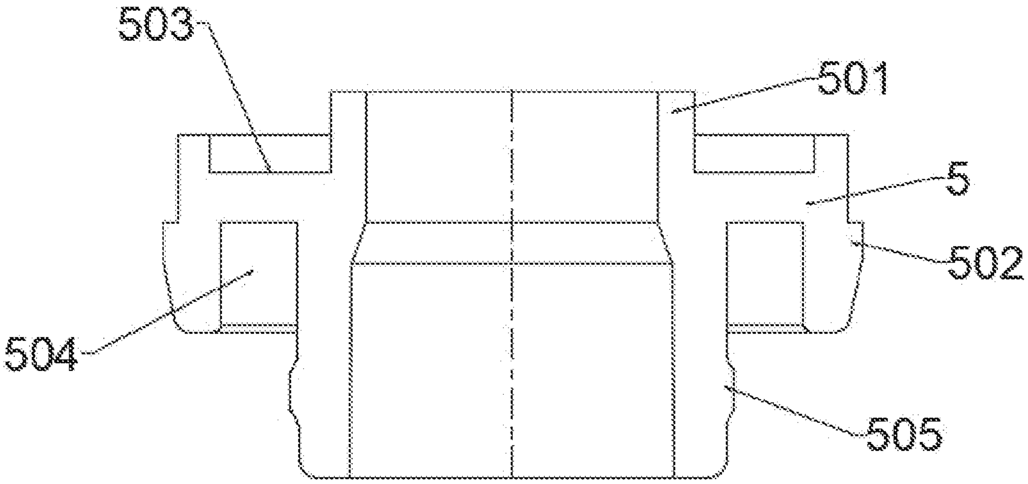
FIG. 10 is a cross-sectional view of a connecting lid in an all-plastic perfume pump according to an embodiment of the present application.

Referring to FIGS. 9 and 10, an inner sleeve 501 is provided in the middle of the connecting lid 5 and used to be sleeved outside the valve stem 6, a first outer flange 502 is provided on an outer wall of the middle of the connecting lid 5 and used to connect the big ring 10, an upper support groove 503 is provided on the upper end of the connecting lid 5 and used to support a resilient piece 7, a lower support groove 504 is provided on a lower end of the connecting lid 5 and used to be sleeved on an opening of the pump body 1, and a second outer flange 505 is provided on a lower end of the connecting lid 5; the second outer flange 505 is inserted into the interior of the pump body 1 and matches with an inner groove 102 to attach the connecting lid 5 to the pump body 1, and the bottom of the connecting lid 5 is used for limiting the piston 4.

Figure 11:
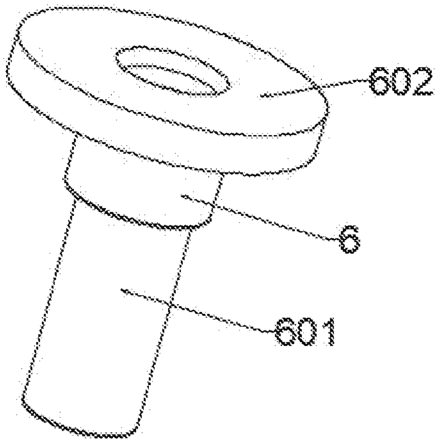
FIG. 11 is a schematic diagram showing a valve stem in an all-plastic perfume pump according to an embodiment of the present application.
Figure 12:
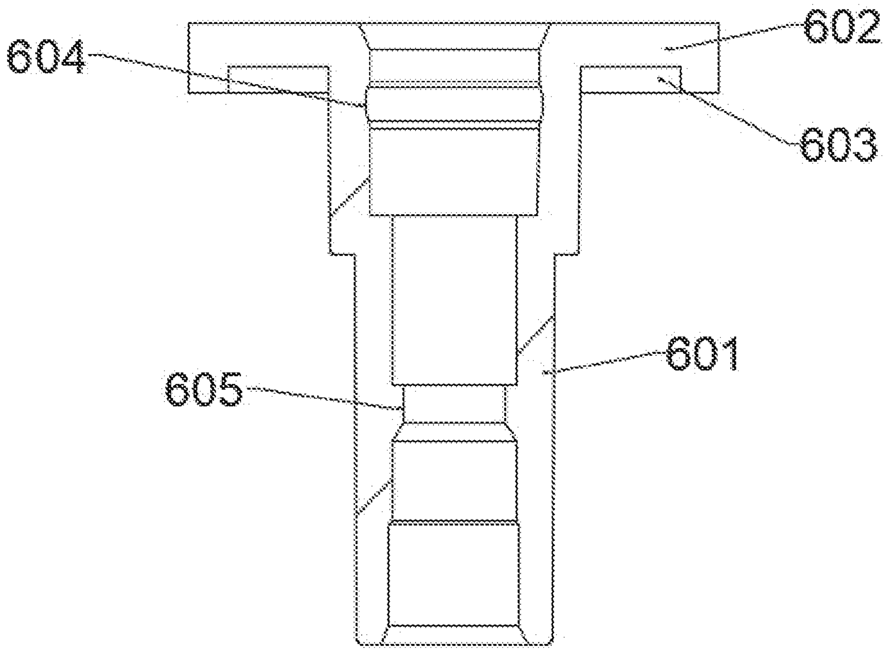
FIG. 12 is a cross-sectional view of a valve stem in an all-plastic perfume pump according to an embodiment of the present application.

Referring to FIGS. 11 and 12, the valve stem 6 includes a stem body 601 and a boss 602, wherein the diameter of the boss 602 is greater than that of the stem body 601; after the valve stem 6 is connected to a pressing cap 9, an upper end surface of the boss 602 is in contact with the pressing cap 9; the lower end surface of the boss 602 is provided with a limiting groove 603 which is annular and used for limiting an upper end of the resilient piece 7; a fixing groove 604 is provided on the inner wall of the upper part of the stem body 601; and after the stem body 601 is connected to the pressing cap 9, the valve stem 6 is fixed to the pressing cap 9 by matching the fixing groove 604 with the pressing cap 9; an inner protruding rib 605 is provided on the inner wall of the stem body 601, a valve needle 3 is inserted into the stem body 601, and the inner protruding rib 605 is inserted into the annular groove 304 to fix the valve needle 3 with the valve stem 6.

Figure 13:
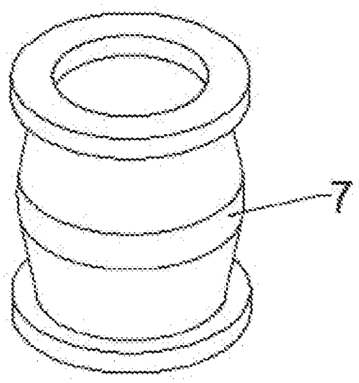
FIG. 13 is a schematic diagram showing a resilient piece in an all-plastic perfume pump according to an embodiment of the present application.
Figure 14:
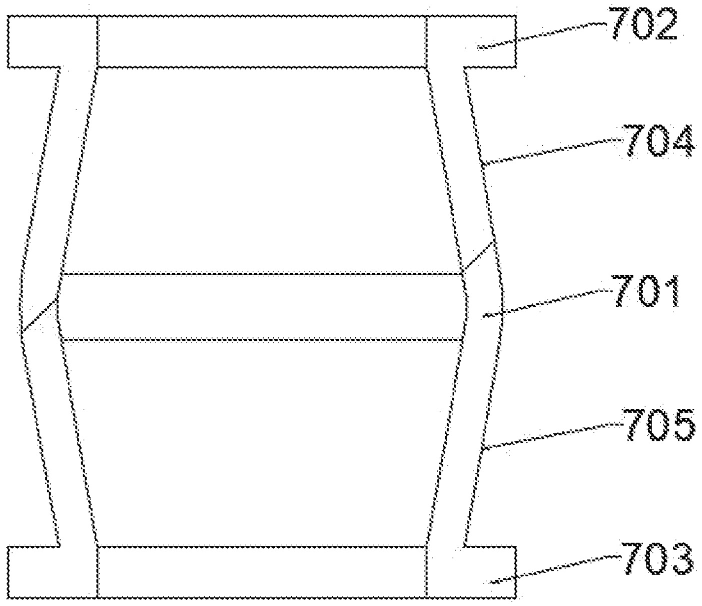
FIG. 14 is a cross-sectional view of a resilient piece in an all-plastic perfume pump according to an embodiment of the present application.

Referring to FIGS. 13 and 14, the resilient piece 7 is of a hollow cylindrical structure, an upper support portion 702 is provided at the upper end of the resilient piece 7 for being inserted into a limiting groove 603, a lower support portion 703 is provided at the lower end of the resilient piece 7 for being inserted into the upper support groove 503, the resilient piece 7 is limited by the connecting lid 5 and the valve stem 6, and when the valve stem 6 is driven to move upwards by pressing the pressing cap 9, the upper support portion 702 and the lower support portion 703 of the resilient piece 7 are supported and limited by the limiting groove 603 and the upper support groove 503; on one hand, the resilient piece 7 is prevented from being misaligned at the upper and lower ends to make the resilient piece 7 lose supporting resilient force; on the other hand, the air inside the resilient piece 7 of a hollow cylindrical structure is not easy to flow out, and the air pressure increases; the resilient piece 7 has a greater resilient force when used with the valve stem 6, and facilitates the ejection of the contents upon pressing; when the pressing cap 9 is released, the resilient piece 7 itself and the air pressure are used to facilitate the resetting of the resilient piece 7, and further facilitate the resetting of the pressing cap 9 and the contents entering the piston 4 and the bottom of the pump body 1 to form a cavity structure, which has a greater resilient force, has better sealing performance, and does not cause liquid leakage.

Furthermore, a protrusion 701 is provided in the middle of the resilient piece 7, the protrusion 701 is an arc surface, a first bevel 704 is provided at a connection between the protrusion 701 and the upper support portion 702, and the first bevel 704 is a conical surface; the diameter of the resilient piece 7 axially extending from the protrusion 701 to the upper support portion 702 gradually decreases; a second bevel 705 is provided at a connection between the protrusion 701 and the lower support portion 703, and the second bevel 705 is an inverted conical surface; the diameter of the resilient piece 7 axially extending from the protrusion 701 to the lower support portion 703 gradually decreases; when the pressing cap 9 is pressed downwards, the valve stem 6 moves downwards; the upper support portion 702 is pressed, the first bevel 704 presses the protrusion 701 downwards, and the protrusion 701 expands outwards, so as to realize the compression of the resilient piece 7; since the diameter of the resilient piece 7 located at the protrusion 701 is greater than the diameter of the first bevel 704 and the second bevel 705, the flexibility of the protrusion 701 is relatively greater, and the hardness of the first bevel 704 and the second bevel 705 relative to the protrusion 701 is greater; the protrusion 701 provided facilitates the resilient piece 7 to be compressed, and the first bevel 704 and the second bevel 705 provided facilitate the resilient piece 7 to reset from a compressed state, the pressing cap 9 is released, the resilient piece 7 is reset, the valve stem 6 is pushed to move upwards and reset, and the resilient piece 7 made of plastic replaces the spring made of metal, so as to facilitate the recycling of the perfume pump, and further achieve the requirements of environmental protection and energy saving.

Figure 15:
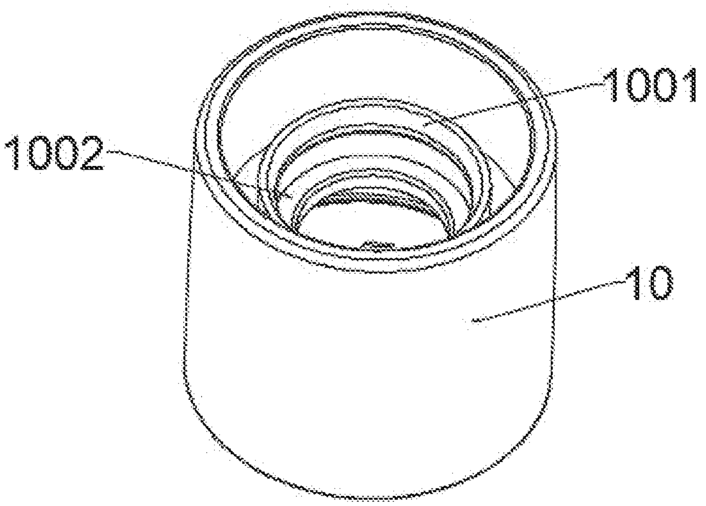
FIG. 15 is a schematic diagram showing a structure of a big ring in an all-plastic perfume pump according to an embodiment of the present application.
Figure 16:
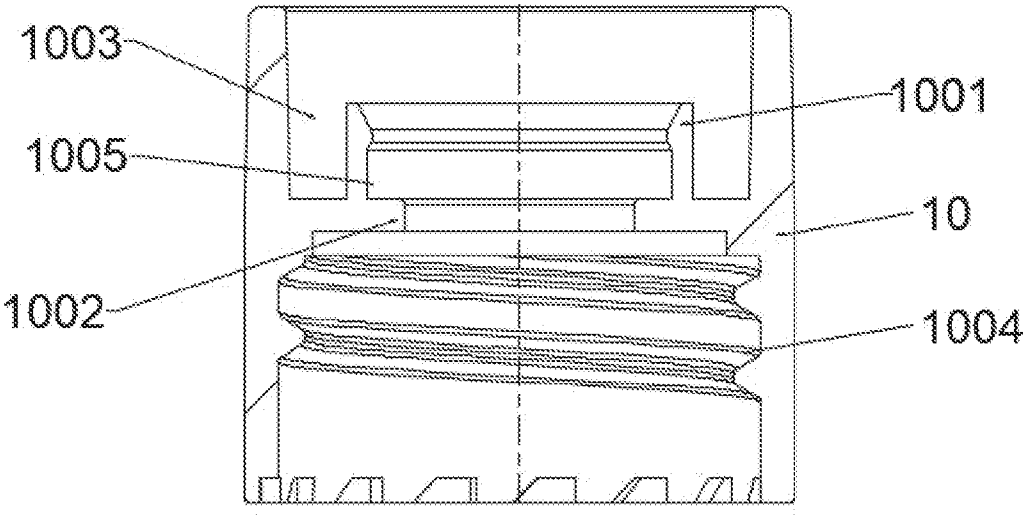
FIG. 16 is a cross-sectional view of a big ring in an all-plastic perfume pump according to an embodiment of the present application.

Referring to FIGS. 15 and 16, a sleeve 1001 is provided inside the big ring 10, a support ring 1002 is provided inside the sleeve 1001 for supporting the connecting pressing cap 5, a clamping groove 1005 is provided on the inner wall of the sleeve 1001, the connecting pressing cap 5 is inserted into the sleeve 1001, a first outer flange 502 is embedded in the clamping groove 1005 to connect the connecting pressing cap 5 with the big ring 10, an annular groove 1003 is provided between the sleeve 1001 and the inner wall of the big ring 10 for limiting the horizontal direction of the pressing cap 9 to reduce the shaking generated when pressing the pressing cap 9, and an internal thread is provided at an opening of the lower end of the sleeve 1001 for connecting the bottle body.

In another embodiment, a bottle body is provided, an external thread is provided at the opening of the bottle body, and the bottle body is connected to an all-plastic perfume pump and a bottle body used therefor for storing perfume.

Working principles of the present invention:

when a perfume pump is in use, a big ring 10 is connected to the bottle body, a spacer 11 is located at an opening of the bottle body to play a sealing function, a pressing cap 9 is pressed downwards to drive the valve stem 6 to move downwards to drive the valve needle 3 and the piston 4 to move downwards, the valve stem 6 and the connecting lid 5 pressing the resilient piece 7, the contents in the cavity structure formed by the piston 4 and the bottom of the pump body 1 are squeezed; at this time, the plastic bead 2 is subjected to a downward pressure to block the bottom of the pump body 1, the space in the cavity structure increases, the contents push the piston 4 upwards, the valve needle 3 continues moving downwards under the external pressure, and the space in the cavity structure gradually reduces to separate the sealing conical surface 402 from the sealing ring 305 and expose the liquid inlet 302; the contents in the cavity structure enter the liquid outlet 303 from the liquid inlet 302, then are sprayed out of the spray sheet 8 as a mist via the valve stem 6 and the pressing cap 9; after the bottom surface of the pressing cap 9 is in contact with the bottom surface of the annular groove 1003, the pressing cap 9 stops moving upwards to complete one-time spraying;

the pressing cap 9 is released and the spring 7 elongates to push the valve stem 6 to move upwards to drive the valve needle 3 to move upwards, the space in the cavity structure gradually increases, and a negative pressure is generated in the cavity structure; the contents inside the bottle body move along the suction tube 12 under the action of atmospheric pressure and push the plastic bead 2 to enter the cavity structure; since the plastic bead 2 under the same volume is lighter than the glass bead, the plastic bead 2 can be separated from the bottom interface of the pump body 1 under a relatively small pressure of the contents, so as to achieve feeding; when the pressure inside the cavity structure and the pressure inside the bottle body are balanced, the sealing ring 305 of the valve needle 3 is attached to the sealing conical surface 402 of the piston 4, so that the contents do not flow back into the bottle body, at this time, the cavity structure is used for temporarily storing the contents to be sprayed next time.

It is to be understood that the described embodiments are only a few, but not all embodiments of the present invention. Based on the embodiments of the present invention, all other embodiments obtained by a person skilled in the art and related fields without inventive effort should fall within the scope of the present invention. The structures, apparatuses, and methods of operation not specifically described or illustrated herein, if not specifically described or limited, may be practiced by conventional means in the art.

What is claimed is:

1. An all-plastic perfume pump comprising a pump body, wherein a plastic bead is provided inside the pump body, the pump body is mounted in a big ring, a piston is provided inside the pump body, a valve needle is inserted into a piston, an upper end of the valve needle is connected to a valve stem, a connecting lid is attached at a top opening of the pump body, a resilient piece is provided at an upper end of the connecting lid and sleeved on the valve stem, and the valve stem and the valve needle are used for supporting and limiting the resilient piece;

wherein the valve needle is integrally formed, the valve needle comprises a needle body and a sealing ring, an upper end surface of the sealing ring is in a conical shape, the valve needle is inserted into the piston, and then the piston is mounted in the pump body, and a cavity structure is formed at the bottom of the piston and the pump body;

the valve stem comprises a stem body and a boss, the diameter of the boss is greater than that of the stem body, an inner wall of the stem body is provided with an inner protruding rib, the valve needle is inserted into the stem body, and the inner protruding rib is inserted into an annular groove to fix the valve needle with the valve stem; and a protrusion is provided in the middle of the resilient piece, the protrusion is an arc surface, a first bevel is provided at a connection between the protrusion and the upper support portion, the first bevel is a conical surface, and the diameter of the resilient piece axially extending from the protrusion to the upper support portion gradually decreases; a second bevel is provided at a connection between the protrusion and the lower support portion, the second bevel is an inverted conical surface, and the diameter of the resilient piece extending axially from the protrusion to the lower support portion gradually decreases.

2. The all-plastic perfume pump according to claim 1, wherein the resilient piece and the plastic bead are made of plastic.

3. The all-plastic perfume pump according to claim 1, wherein the bottom of the pump body is provided with an accommodating cavity for placing the plastic bead, and an inner wall of a pump cavity of the pump body is provided with an inner groove for clamping the connecting lid.

4. The all-plastic perfume pump according to claim 1, wherein an inner sleeve is provided in the middle of the connecting lid for sleeving outside the valve stem, a first outer flange is provided on an outer wall of the middle of the connecting lid for connecting the big ring, an upper support groove is provided on the upper end of the connecting lid for supporting the resilient piece, a lower support groove is provided on a lower end of the connecting lid for sleeving at an opening of the pump body.

5. The all-plastic perfume pump according to claim 1, wherein the resilient piece is of a hollow cylindrical structure, an upper end of the resilient piece is provided with an upper support portion for being inserted into a limiting groove, and a lower end of the resilient piece is provided with a lower support portion for being inserted into the upper support groove.

6. A bottle body, wherein the bottle body is applied to the all-plastic perfume pump according to claim 1, wherein an external thread is provided at an opening of the bottle body, and the bottle body is connected to a big ring for storing contents.

* * * * *